Figures 1, 2, 3:
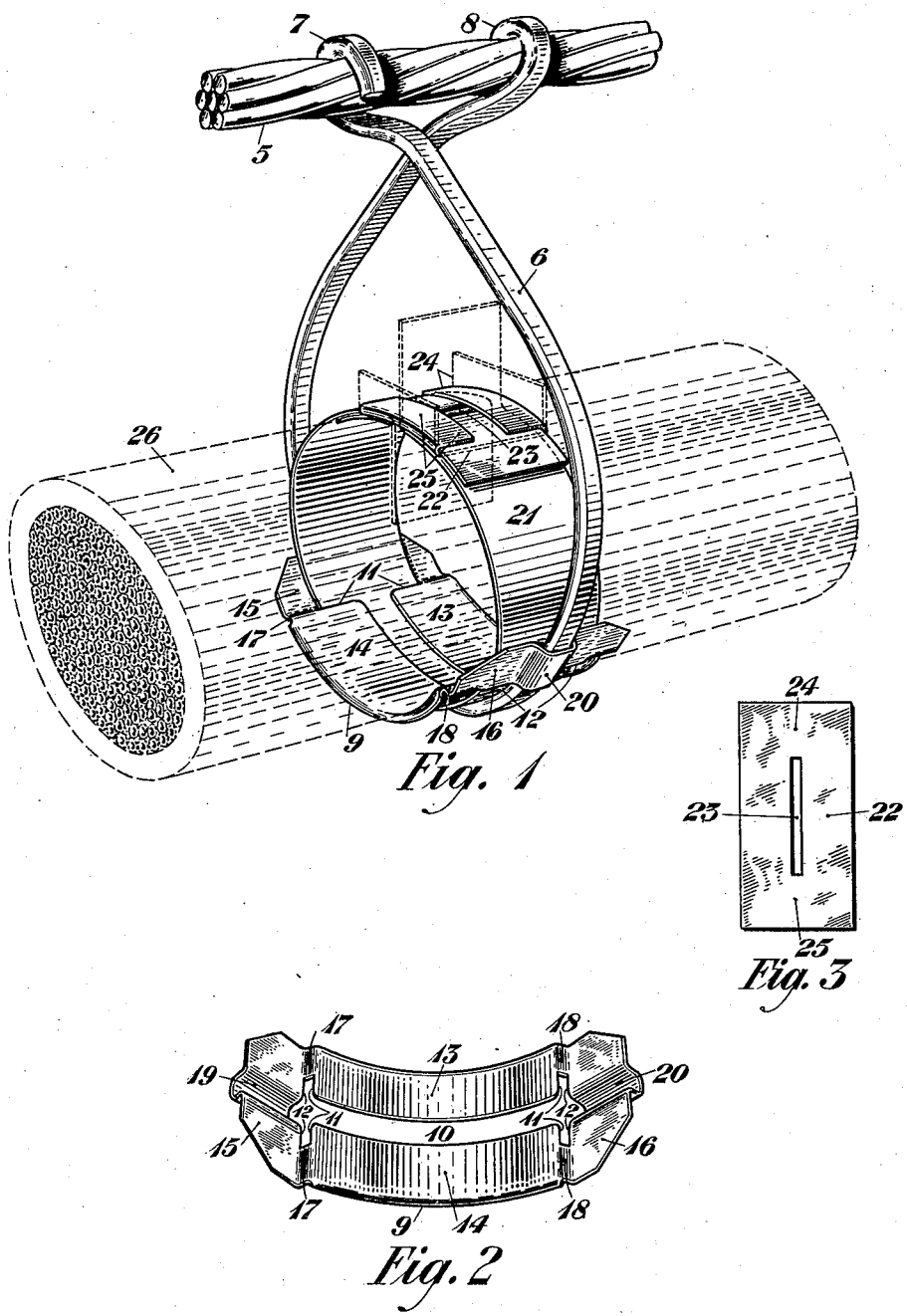

E. M. MATTHEWS.
CABLE HANGER.
APPLICATION FILED MAY 28, 1920.

1,369,828.

Patented Mar. 1, 1921.

INVENTOR
E. M. Matthews
BY
ATTORNEY

UNITED STATES PATENT OFFICE.

EDGAR M. MATTHEWS, OF JAMAICA, NEW YORK, ASSIGNOR TO AMERICAN TELEPHONE AND TELEGRAPH COMPANY, A CORPORATION OF NEW YORK.

CABLE-HANGER.

1,369,828.         Specification of Letters Patent.         Patented Mar. 1, 1921.

Application filed May 28, 1920. Serial No. 384,973.

*To all whom it may concern:*

Be it known that I, EDGAR M. MATTHEWS, residing at Jamaica, in the county of Queens and State of New York, have invented certain Improvements in Cable-Hangers, of which the following is a specification.

This invention relates to supporting devices, and more particularly to means for suspending electrical transmission cables from a messenger wire which is firmly attached to poles placed at different intervals along a transmission line.

For some time past it has been customary to support aerial telephone, telegraph and power transmission cables by means of a ring attached to the messenger wire, which is, in turn, supported by and securely attached to poles. These rings vary widely in their form and mode of attachment to the messenger wire, but in general they have been designed so as to grip the strand tightly and thereby avoid, in so far as is practicable, any movement along the messenger wire, and any lateral movement about said wire as an axis. After the rings have been placed upon a messenger wire, the cable to be supported is drawn through successive rings by any suitable means, such as a rope, which has been previously threaded through the rings.

It has been observed that cables suspended from messenger wires by means of rings, have after varying periods of time, shown signs of wear, such as cutting and cracking where supported by the first few rings on each side of the poles to which the messenger wires are attached.

A careful investigation of the cause of this trouble leads to the conclusion that the cutting or abrasion of the sheath by the rings is caused primarily by the swinging or vibrating of the cable, which induces a lateral, vertical or torsional movement of the cable in the rings near the poles. As a result of this movement, the cable sheath rubs against the rings, and is gradually cut away by the friction of the relatively rough surface of the rings. This, of course, permits the entrance of moisture into the cable and circuit troubles result.

This invention consists in a cable support which is capable of attachment to the messenger wire in a manner which will prevent longitudinal movement along said wire and is also free to swing laterally with the lateral movement of the cable, thereby substantially avoiding any relative movement of the cable and the cable support, and consequently, practically eliminating the abrasive effect heretofore experienced with rings or other cable supports that are rigidly attached to the messenger wires.

In the annexed drawing, Figure 1 illustrates in perspective the cable support attached to the messenger wire, and constructed in accordance with one embodiment of this invention; Fig. 2 is a perspective view of a clip member which forms part of the improved device; and Fig. 3 is an elevation of the connecting means for fastening the ends of the cable strap or band together.

This invention will be more fully understood upon reference to the drawing, in which 5 represents the messenger wire. A ring 6 is suspended from said wire by any well-known means such as by hooked members 7 and 8. Associated with the lower portion of the ring 6, in a manner which will presently be described, is a clip 9, formed to correspond to the curvilinear surface of said ring. A slot 10 is shown as extending longitudinally on said clip and terminating in portions lying at right angles thereto provided with opposite edges 11 and 12. The edges 12 are pressed outwardly to a wider arc than the edges 11. Lying at either side of the longitudinal slot 10 are saddle members 13 and 14, which provide a bearing surface of relatively large area upon which the cable rests. Integral with the members 13 and 14, and formed at either end thereof, are offset portions 15 and 16 provided with shoulders 17 and 18, respectively. Extending through the portions 15 and 16 and in substantial alinement with the axis of the longitudinal slot 10 are grooves 19 and 20. The ring is adapted to be seated in the grooves 19 and 20 of the clip 9, and said clip is attached to the ring by means of a strap or band 21. One end of this strap is inserted in one of the transverse portions of the longitudinal slot 10 and pushed along, passing beneath slot 10 and between the saddle members 13 and 14, and the ring 6 until it emerges through the opposite transverse portion of said longitudinal slot, thereby retaining the clip in movable relation to the ring 6. At 22 is represented a rectangular sheet of metal, more clearly shown in Fig. 3, which is provided with a slot 23 in the central portion thereof, through which the ends of the strap 21 are inserted and bent back upon themselves. When the ends of the strap 31 are in place, portions 24 and 25 of the member 22 are turned upwardly, as indicated by dotted lines in Fig. 1, and then pressed into a flat position.

In the installation of the improved cable hanger, the ring 6 is attached to the messenger wire 5 in an obvious manner and the cable is passed through the ring. The clip 9 is then applied to the ring the bottom portion of said ring being inserted through the slot 10 of the clip so that the ring rests in the grooves 19 and 20, after which one end of the band 21 is drawn through the transverse portion of the slot 10 in a manner previously described. The strap 21 is then passed about the cable 26 and attached to the member 22 as outlined previously.

It will be seen that by means of this invention, the clip 9 with its associated band 21 is adapted to hold the cable free from the ring and in definite relation thereto and force the cable and ring to swing together. Consequently, there is substantially no relative movement between the cable and the cable support upon which it rests, and, as a result thereof, the abrasive effect on the cable sheath is negligible.

While the ring to which the cable clip is attached is indicated as of a particular configuration, it will be obvious that it may be of any other desired design, and although this invention has been shown as embodied in a particular form, it is to be noted that it is capable of embodiment in many and widely varied forms without departing from the spirit of the invention as defined in the appended claims.

What is claimed is:

1. In a cable supporting device adapted to be secured to a messenger wire, a ring provided with hooked members for gripping said wire, a clip member mounted on said ring, a band for retaining said clip in position on said ring, and securing means for holding the ends of said band together.

2. In a cable supporting device adapted to be secured to a messenger wire, a ring provided with hooked members for gripping said wire, a clip member mounted on the lower portion of said ring, a movable band on said ring for retaining the clip in position, and securing means for holding the ends of said band together.

3. In a cable supporting device adapted to be secured to a messenger wire, a ring provided with hooked members for gripping said wire, a clip member mounted on said ring provided with a saddle member for seating a cable, a band for retaining the clip in position on the ring and the cable in position on said saddle member, and securing means for holding the ends of said band together.

4. In a cable supporting device adapted to be secured to a messenger wire, a ring provided with hooked members for gripping said wire, a clip comprising a saddle member for seating a cable, grooved members formed in the clip for engaging said ring and movable thereon in the direction of the movement of said cable, a band encircling said cable and retaining said clip in position on said ring, and securing means for holding the ends of said band in encircled position on said cable.

5. In a cable supporting device adapted to be secured to a messenger wire, a ring provided with hooked members for gripping said wire, a clip comprising a saddle member for seating a cable, grooved members formed in said clip adapted to engage said ring, a band encircling said cable for retaining the clip in engagement with the ring and adapted to move therewith, and securing means for holding the ends of said band together.

6. In a cable supporting device adapted to be secured to a messenger wire, a ring provided with hooked members for gripping said wire, a clip member mounted on said ring, a band for retaining said clip in position on said ring, said clip member and band retaining the cable in definite relation to the ring, and securing means for holding the ends of said band together.

In testimony whereof, I have signed my name to this specification this 27th day of May, 1920.

EDGAR M. MATTHEWS.